United States Patent [19]

Kawasaki et al.

[11] Patent Number: 4,736,461

[45] Date of Patent: Apr. 5, 1988

[54] METHOD OF TRANSMITTING TERMINATING CALL SIGNALS WITHIN A RESTRICTED DURATION AND A BASE STATION AND A PORTABLE UNIT FOR USE IN THE SAME

[75] Inventors: Ryoji Kawasaki, Kanagawa; Kazuhiro Yoshizawa, Chiba; Akio Yotsutani, Tokyo; Noboru Saegusa, Tokyo; Koichi Ito, Tokyo; Syozi Huse, Tokyo, all of Japan

[73] Assignee: Nippon Telegraph & Telephone Public Corporation: NEC Corporation & Kabushiki Kaisha Toshiba, Japan

[21] Appl. No.: 13,823

[22] Filed: Feb. 12, 1987

Related U.S. Application Data

[62] Division of Ser. No. 705,944, Feb. 26, 1985, Pat. No. 4,679,244.

[30] Foreign Application Priority Data

Feb. 29, 1984 [JP] Japan .................. 59-38029

[51] Int. Cl.⁴ .............................................. H04B 7/00
[52] U.S. Cl. ........................... 455/343; 455/35; 455/38; 455/54; 455/58
[58] Field of Search ............. 455/54, 31, 35, 38, 455/56, 58, 343, 76, 67, 89; 340/825.69, 825.5

[56] References Cited

U.S. PATENT DOCUMENTS

| | | | |
|---|---|---|---|
| 4,449,248 | 5/1984 | Leslie et al. | 455/343 |
| 4,506,386 | 3/1985 | Ichikawa et al. | |
| 4,509,199 | 4/1985 | Ichihara | 455/343 |
| 4,523,332 | 6/1985 | Mori | 455/343 |
| 4,631,496 | 12/1986 | Borras et al. | 455/76 |
| 4,663,623 | 5/1987 | Lay et al. | 455/343 |
| 4,679,244 | 7/1987 | Kanasaki et al. | 455/343 |

*Primary Examiner*—Robert L. Griffin
*Assistant Examiner*—Curtis Kuntz
*Attorney, Agent, or Firm*—Sughrue, Mion, Zinn, Macpeak, and Seas

[57] ABSTRACT

A portable unit that may be called from a base station through a radio control channel by a succession of terminating call signals that is sent through the control channel from the base station to the portable unit for a first or restricted time duration ($T_1$), selected in consideration of a battery saving period of a battery saving operation carried out in the portable unit. Within the battery saving period, the portable unit is put into transient active and inactive states during a first time interval and a second time interval, respectively. Selection is made so that the first time duration is longer than the second time interval to receive at least one of the terminating call signals within the first time duration in the portable unit. The base station monitors an acknowledgement signal for a second time duration ($T_2$) after the lapse of the first time duration and interrupts the control channel when the acknowledgement signal is not received within the first and the second time durations. In the portable unit, the battery saving operation is released when the presence of the terminating call signals is detected by a squelch circuit.

1 Claim, 2 Drawing Sheets

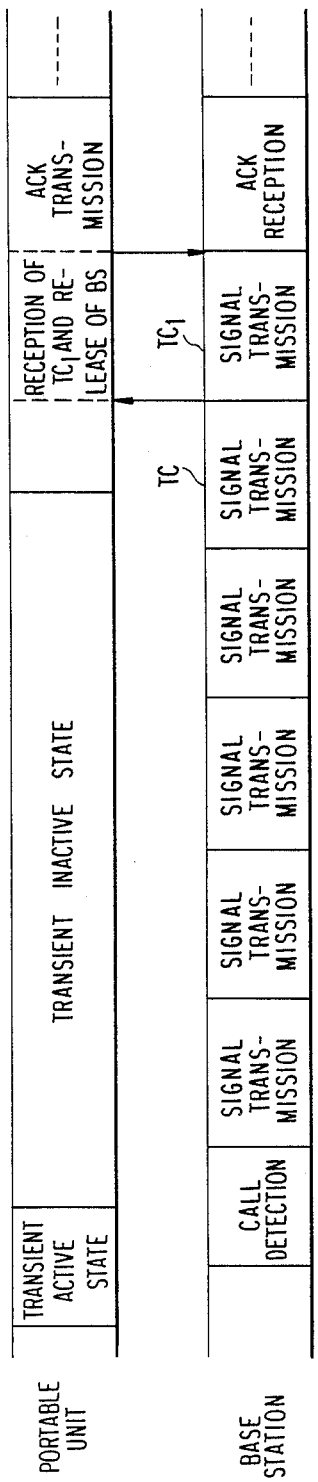
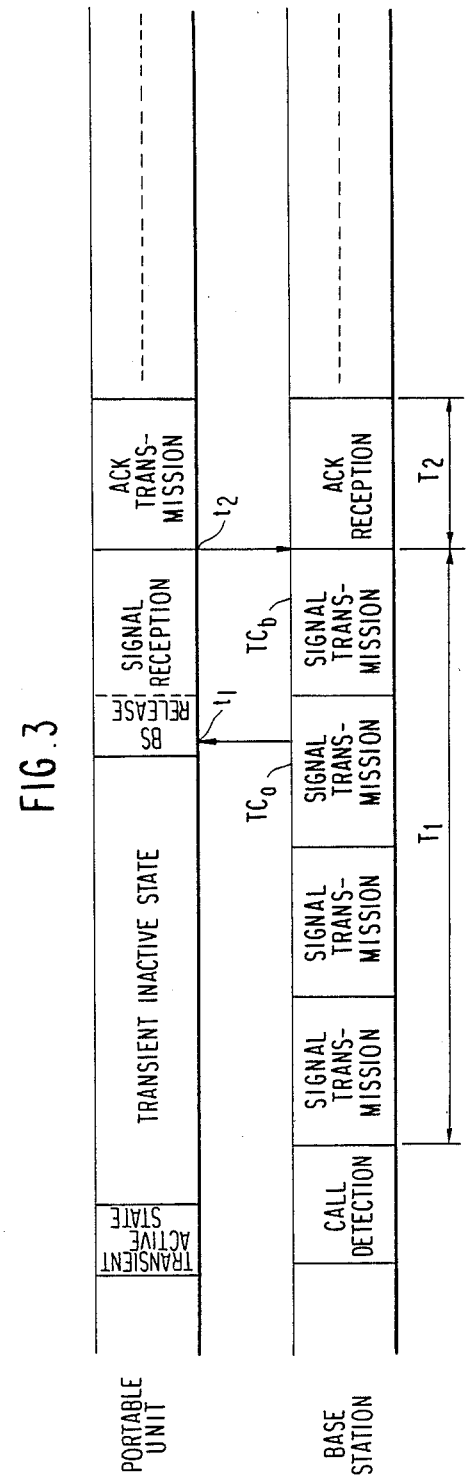
FIG. 1 PRIOR ART
FIG. 3

METHOD OF TRANSMITTING TERMINATING CALL SIGNALS WITHIN A RESTRICTED DURATION AND A BASE STATION AND A PORTABLE UNIT FOR USE IN THE SAME

This is a division of application Ser. No. 705,944, filed Feb. 26, 1985, now U.S. Pat. No. 4,679,244.

BACKGROUND OF THE INVENTION

This invention relates to a method of transmitting a terminating call signals in a radiotelephone system and to a base station and a portable unit both of which are for use in the method. It is mentioned here that the portable unit may be a cordless telephone set, a handset, or the like, and conveyed by a vehicle, such as a land mobile, or a person and that the base station is fixed at a predetermined site and may therefore be called a fixed station.

As a radiotelephone system, a multiple channel access system is known wherein each of radio channels is used in common to a plurality of portable units. The multiple channel access system is very effective in view of significant utilization of the radio channels. In the multiple channel access system, a selected one of the radio channels is used to transfer a wide variety of control signals, such as a terminating call signal, between the base station and the portable units and may therefore be called a control channel. In this connection, the remaining channels may be referred to as speech channels. From this fact, it is readily understood that availability of the multiple channel access system greatly depends on a length of occupied time in the control channel.

On the other hand, the portable unit comprises a receiver portion driven by a battery. The receiver portion may not always be put into an active state because occurrence of the terminating call signal is intermittent or spontaneous. Under the circumstances, a battery saver circuit is included in the portable unit in order to save power consumption of the battery and to thereby extend a life time of the battery. More specifically, the battery saver circuit periodically puts the entirety of the receiver portion into transient active and inactive states during a first time interval and during a second time interval considerably longer than the first time interval, respectively. In other words, a battery saving operation is carried out in the battery saver circuit during the second time interval at a battery saving period. Preferably, the battery saving period is as long as possible in the light of saving of electric power of the battery.

In U.S. Pat. No. 4,419,765 issued to Wycoff et al, a receiver is disclosed wherein the battery saving operation must intermittently be interrupted after lapse of the first time interval to put the receiver portion into a receiving state when the terminating call signal is received during the first time interval. Thereafter, the intermittent interruption of the battery saving operation is changed to a continuous interruption when the terminating call signal is found to be destined to the portable unit in question after detection of the terminating call signal. Otherwise, the battery saving operation is restarted.

Let the terminating call signal be produced by the base station in the form of a succession of digital signals. In this event, the intermittent interruption of the battery saving operation becomes objectionably long because the detection of the terminating call signal should be made through a filter with reference to at least one of the digital signal succession, for example, during a couple of the digital signal successions. As a result, electric power of the battery might be wasted during the intermittent interruption.

It is possible to reduce occurrence of the intermittent interruption by extending the battery saving period. However, it takes a long time to access the portable unit in question. This means that the control channel is occupied by the base station for a long time on production of each terminating call signal.

To the contrary, the intermittent interruption frequently occurs in the portable unit and results in serious consumption of the battery, when the battery saving period is shortened.

SUMMARY OF THE INVENTION

It is an object of this invention to provide a method of transmitting a terminating call signal in a multiple channel access system, wherein an occupied time of a control channel can be reduced on transmitting the terminating call signal.

It is another object of this invention to provide a base station for use in a method of the type described, which is capable of shortening the occupied time of the control channel.

It is still another object of this invention to provide a portable unit which is for use in combination with a base station of the type described and which can shorten an intermittent interruption of a battery saving operation.

A method to which this invention is applicable is for use in calling a portable unit from a base station through a radio control channel. The method comprises the steps of repeatedly producing in the base station a terminating call signal as a call signal succession, periodically putting the portable unit into transient active and inactive states during a first time interval and during a second time interval following the first time interval, respectively, and keeping the portable unit into a continuous active state when one of the terminating call signals is received during the first time interval. According to this invention, the method comprises the steps of measuring in the base station a first duration longer than the second time interval and restricting production of the call signal succession within the first duration.

According to an aspect of this invention, there is provided a base station which is for use in the above-mentioned method and which comprises measuring means operable in relation to an incoming call for measuring a first duration longer than the second time interval, signal producing means coupled to the measuring means for iteratively producing electric call signals representative of the terminating call signals only during the first duration, and sending means coupled to the signal producing means for sending the electric call signals to the portable unit as the terminating call signals.

According to another aspect of this invention, there is provided a portable unit which is for use in combination with the base station mentioned above and which comprises a controllable battery saver circuit for putting the portable unit into the transient active and inactive states and receiving means coupled to said battery saver circuit for carrying out reception operation of radio signals including the terminating call signals. The portable unit further comprises means coupled to the receiving means for producing a presence signal representative of presence of the terminating call signals and means for supplying the presence signal to the battery saver circuit to make the controllable battery saver circuit release the battery saving operation.

BRIEF DESCRIPTION OF THE DRAWING

FIG. 1 is a time chart for use in describing a conventional method of calling a portable unit from a base station;

FIG. 3, depicted below FIG. 1, is a time chart for use in describing the method mentioned in conjunction with FIG. 2.

DESCRIPTION OF THE PREFERRED EMBODIMENTS

Figure 2:
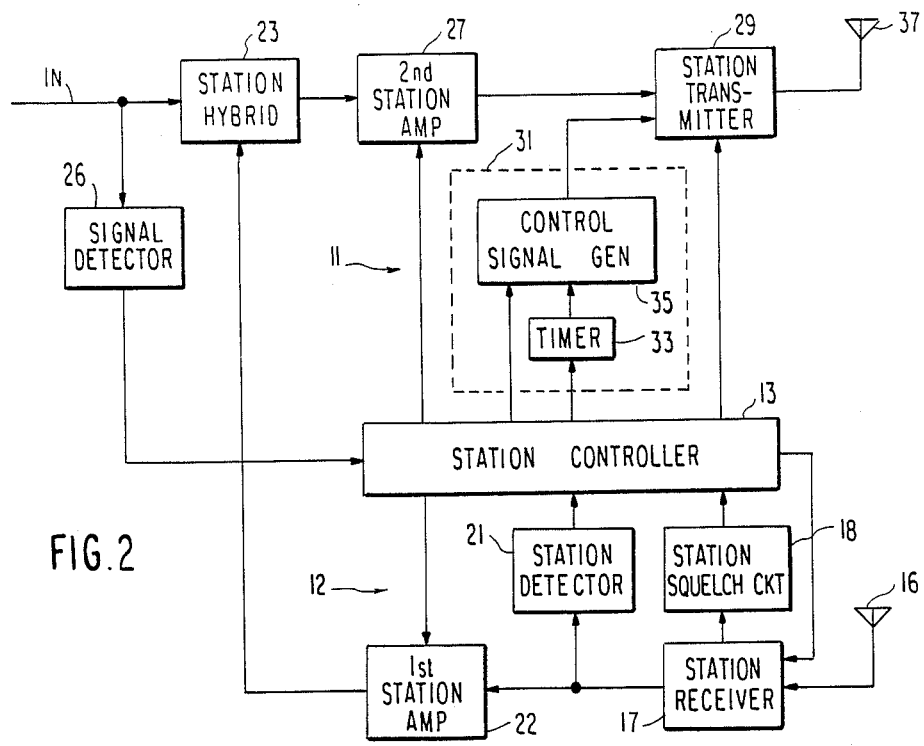
FIG. 2 is a block diagram of a base station for use in a method according to a preferred embodiment of this invention.

Referring to FIG. 1, description will be made in order to facilitate an understanding of this invention as regards a conventional method of calling a portable unit from a base station through a control one of radio channels in a multiple channel access system. The remaining radio channels may be referred to as speech channels.

As shown along the top line of FIG. 1, the portable unit is periodically put into a transient active state and a transient inactive state by a battery saver circuit (not shown, often indicated by BS) included therein when any signals are not received. The transient active and inactive states are repeated at a predetermined period which may be called a battery saving period and which consists of a first and a second time interval for the transient active and inactive states, respectively. Practically, the first time interval may be equal to one tenth of the second time interval, although the first time interval is expanded in this figure for convenience of illustration. As a result, each battery saving period may almost be determined by the second time interval.

Inasmuch as the battery saver circuit is turned off during the transient active state of the receiver or turned on during the transient inactive state thereof, the first and the second time intervals may be also called turnoff and turnon durations of the battery saving circuit, respectively. It is therefore readily understood that the battery saver circuit carries out battery saving operation only for the turnon duration of the battery saving circuit.

On the other hand, the base station is supplied with an incoming call through a subscriber line extended to an exchange. After detection of the incoming call, the base station repeatedly produces through the radio control channel a terminating call signal as a call signal succession. Each terminating call signal is modulated by a start code, an identification code, and a channel indication code all of which are shown in the art and which are given in the form of sequences of digital signals. The call signal succession lasts irrespective of the battery saving period. In other words, the terminating call signals for each incoming call are produced until a response is received from the portable unit, as will later be described.

The call signal succession is time sequentially delivered to the portable unit. It is assumed that each terminating call signal is destined to the portable unit in question. Let the portable unit be changed to the transient active state in course of reception of a specific one TC of the terminating call signals. The specific terminating call signal TC is sent through a filter (not shown) to a discriminator (not shown also) to detect whether or not the specific terminating call sigal TC is destined to the portable unit. In this event, the discriminator judges that the specific terminating call is not destined or directed to the portable receiver because a whole of the specific terminating call signal TC is not received. In other words, the discriminator is not aware of arrival of the incoming call until the following terminating call signal depicted at $TC_1$ arrives at the portable unit after the specific terminating call.

After discrimination of the following terminating call $TC_1$, the battery saver circuit is released to put the entirety of the portable unit into a continuous active state. When the following terminating call signal $TC_1$ carries no incoming call destined to the portable unit, the battery saver circuit is turned on again to put the portable unit into the transient inactive state. Anyway, the portable unit becomes active for a long time in comparison with the transient active state because each terminating call signal is usually longer than the first time interval. In other words, the battery saver circuit is turned off until the following terminal call signal $TC_1$. Thus, the portable unit is kept in an active state after the transient active state. In other words, the battery saver circuit should intermittently be interrupted after lapse of the first time interval. As a result, intermittent interruption of the battery saver circuit becomes long as described in the preamble of the instant specification.

After discrimination of the incoming call destined to the portable unit, an acknowledgement signal (ACK) is transmitted from the portable unit to the base station in the manner known in the art.

Referring to FIG. 2, a base station is for use in a method according to a preferred embodiment of this invention and is connected to an exchange (not shown) through a subscriber line i a usual manner. The illustrated base station comprises a station transmitter section 11, a station receiver section 12, and a station controller 13 coupled to both of the station transmitter section 11 and the station receiver section 12 to control both of them in the manner known in the art. The station receiver section 12 is similiar in structure to a conventional station receiver section. More specifically, the station receiver section 12 comprises a station reception antenna 16 responsive to a radio input signal and a station receiver 17 coupled to the station reception antenna 16 to produce a reception signal. A station squelch circuit 18 monitors a reception state of the station receiver 17 by measuring intensity of a reception electric field. Supplied with a result of measurement from the station squelch circuit 18, the station controller 13 starts a reception operation. On the other hand, a station detector 21 is operable to detect a reception control signal in response to the reception signal and to deliver the reception control signal to the station controller 13. In addition, the reception signal is sent to a first station amplifier 22 controlled by the station controller 13 and thereafter delivered to the exchange through a station hybrid 23 and the subscriber line.

Referring to FIG. 3 together with FIG. 2, the station transmitter section 11 comprises a signal detector 26 for detecting a ringing signal of 16 Hz on reception of an incoming call IN from the exchange. When the ringing signal of 16 Hz is detected by the signal detector 26, as shown along the bottom line of FIG. 3, the station controller 13 begins to process the incoming call. A speech signal accompanied by the incoming call is also sent through the station hybrid 23 and a second station amplifier 27 to a transmitter 29 after detection of the ringing signal in a conventional manner.

The station controller 13 energizes a control signal producing circuit 31 in response to the detection of the ringing signal to iteratively produce an electric control signal corresponding to the incoming call for a first duration $T_1$ as shown along the bottom line of FIG. 3. The first duration $T_1$ is selected in consideration of a battery saving period of a portable unit as will later be described with reference to FIG. 4.

In order to carry out the above-mentioned operation, the control signal producing circuit 31 comprises a timer 33 enabled on detection of the ringing signal for measuring the first duration $T_1$ and a control signal generator 35 for repeatedly generating the electric control signal only for the first duration $T_1$ under control of the station controller 13. The electric control signal is supplied to the station transmitter 29 set to the control one of the radio channels by the station controller 13.

As a result, a succession of the electric control signals is transmitted as a succession of the terminating call signals from the station transmitter 29 through a transmission antenna 37 via the control channel.

From the above, it is readily understood that production of the terminating call signals is limited within the first duration $T_1$ regardless of reception of an acknowledgement signal (ACK) to be given from the portable unit. After lapse of the first duration $T_1$, the station controller 13 forcibly interrupts the control channel when a second duration $T_2$ lapses without reception of the acknowledgement signal (ACK). Thus, when the first and the second durations $T_1$ and $T_2$ lapse without reception of the acknowledgement signal, the station controller 13 regards the incoming call as being abandoned.

Figure 4:
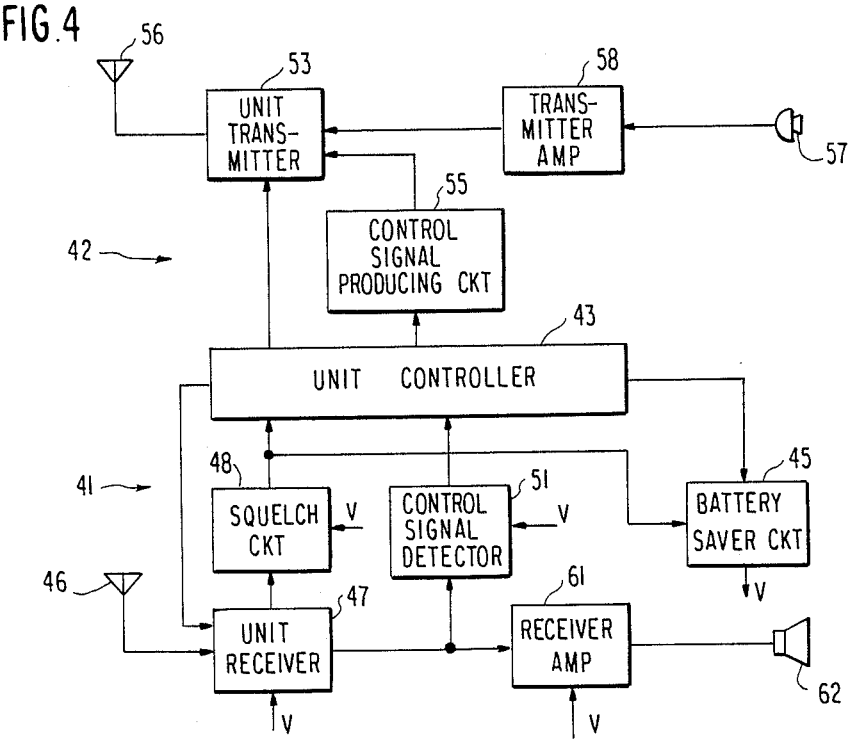
FIG. 4 is a block diagram of a portable unit for use in combination with the base station depicted in FIG. 2.

Referring to FIG. 4 afresh and FIG. 3 again, the illustrated portable unit is for use in combination with the base station illustrated in FIG. 2 and is put into transient active and inactive states during a first time interval and a second time interval during a waiting state for each terminating call signal, as shown along the top line of FIG. 3. The transient active and inactive states may be, for example, 70 milliseconds and 630 milliseconds long, respectively, and repeated at a battery saving period of, for example, 700 milliseconds.

More particularly, the portable unit illustrated in FIG. 4 comprises a unit receiver section 41 operable in a manner to be described later, a unit transmitter section 42 operable in a manner similar to that of the conventional portable unit, and a unit controller 43 for controlling both of the unit receiver section 41 and the unit transmitter section 42.

The unit receiver section 41 comprises a battery saver circuit 45 coupled to the unit controller 43 for periodically producing an electric source voltage V under control of the unit controller 43 at the battery saving period. The electric source voltage V is produced for the first time interval and stopped for the second time interval. Under the circumstances, let the terminating call signals be repeatedly delivered from the base station to the portable unit, as illustrated along the bottom line of FIG. 3. Each terminating call signal may last, for example, 200 milliseconds.

During the transient inactive state, no terminating call signal is received by the unit receiver section 41. In FIG. 3, a particular one $TC_a$ of the terminating call signals arrives at a unit reception antenna 46 and is sent to a unit receiver 47 when the transient inactive state is released. The unit receiver 47 comprises a high frequency amplifier, mixers, an intermediate frequency amplifier, and an FM demodulator, in the manner well known in the art, and is set to the control channel during the waiting state. In the example being illustrated, an intermediate output signal is delivered from the intermediate frequency amplifier to a squelch circuit 48 for measuring a field intensity of the control channel during the waiting state. When the squelch circuit 48 detects presence of the terminating call signals on release of the transient inactive state, the squelch circuit 48 supplies the unit controller 43 and the battery saver circuit 45 with a presence signal representative of presence of the terminating call signals before the next following terminating call signal $TC_b$ is received by the unit receiver section 47.

Responsive to the presence signal, the battery saver circuit 45 releases the battery saving operation at a time instant $t_1$ to put the unit receiver section 41 into the active state. Under the circumstances, the next following terminating call signal $TC_b$ is sent through the unit receiver 47 to a control signal detector 51. The start, the identification, and the channel indication codes are detected from the next following terminating call signal $TC_b$ to be delivered to the unit controller 43. A combination of the unit controller 43 and the control signal detector 51 may be referred to as a detection circuit for detecting the terminating call signals.

It should be noted here that the base station produces the terminating call signals only for the first duration $T_1$ as mentioned in conjunction with FIG. 3. Inasmuch as one of the terminating call signals should be received within the first duration $T_1$ by the portable unit, the portable unit must be put into the transient active state at least one time within the first duration $T_1$. For this purpose, the first duration $T_1$ for the call signal succession is selected so that it becomes longer than the second time interval for the transient inactive state. Inasmuch as the battery saving operation of the battery saver circuit 45 is rapidly released or rendered inactive upon detection of presence of the terminating call signals as mentioned before, the first duration $T_1$ may be longer than the second time interval by a third duration for a single one of the terminating call signals. Practically, the first duration $T_1$ is equal to 3.6 seconds in order to reduce the loss probability. The terminating call signals are therefore produced eighteen times for the first duration.

Let the unit controller 43 judge that the next following terminating call is destined to the portable unit in question. In this event, the unit controller 43 sets a unit transmitter 53 to the control channel and drives a control signal producing circuit 55 and puts the battery saver circuit 45 into a continuous inactive state. As a result, the unit receiver section 41 is brought into the continuous active state. The control signal producing circuit 55 sends the acknowledgement signal (ACK) through the unit transmitter 55 and a unit transmission antenna 56 to the base station. Simultaneously, the unit receiver 47 switches from the control channel to one of the speech channels that is specified by the channel indication code.

In FIG. 2, the base station is put into the waiting state of the acknowledgement signal for the second duration $T_2$ after lapse of the first duration $T_1$, as mentioned before. The second duration $T_2$ may be, for example, 200 milliseconds. When the acknowledgement signal (ACK) is received within the first and the second durations T$_1$ and T$_2$, the station controller 13 makes the station transmitter 29 change the control channel to the one speech channel. Thus, a speech signal can be sent from the exchange to the station transmission antenna 37 through the station hybrid 23, the second amplifier 27, and the station transmitter 29. Likewise, another speech signal is sent in the portable unit from a transmitter set 57 to the unit transmitter 53 through a transmitter amplifier 58.

In the portable unit, the speech signal is received by the unit reception antenna 46 and sent through the unit receiver 47 and a receiver amplifier 61 to a receiver unit 62 and reproduced by the receiver unit 62. Thus, communication is carried out between the base station and the portable unit.

Let the acknowledgement signal (ACK) be not received by the base station within the first and the second durations T$_1$ and T$_2$. In this event, the station controller 13 regards the incoming call as being abandoned and makes the station transmitter 29 forcibly interrupt the control channel. Thus, the station transmitter 29 serves to interrupt the control channel.

On the other hand, if no speech signal is received by the portable unit for a preselected duration after transmission of the acknowledgement signal, the unit receiver 47 switches the one speech channel to the control channel under control of the unit controller 43. Thus, the portable unit returns back to the waiting state.

As mentioned above, the control channel is occupied by the terminating call signals only for the first duration. It is therefore possible to improve availability of the control channel. In addition, the battery saving operation of the battery saver circuit 45 is released by detecting presence of any terminating call signal by the squelch circuit 48 before decoding the terminating call signal. Thus, the battery saving operation is controlled in the portable unit with reference to both of the field intensity and the presence signal representative of presence of any digital data signals. A time interval for detecting the field intensity may be shorter than 0.5 millisecond. Accordingly, it is possible to shorten a duration for the active state of the unit receiver section 41 and to therefore save power consumption of the battery. In addition, detection of the digital data signals serves to establish bit synchronism and to insure accuracy of detection.

While this invention has thus far been described in conjunction with a preferred embodiment thereof, it will readily be possible for those skilled in the art to put this invention into practice in various other manners. For example, the receiver antennas 16 and 46 may be common to the transmitter antennas 37 and 56, respectively.

What is claimed is:

1. A portable unit responsive to a sequence of terminating call signals repeatedly supplied to said portable unit and periodically put by a controllable battery saver circuit into transient active and inactive states during a first time interval and during a second time interval following said first time interval with battery saving operation transiently released and carried out in said battery saver circuit, respectively, said portable unit being kept in a continuous active state when one of said terminating call signals is received during said first time interval and comprising receiving means coupled to said battery saver circuit for carrying out reception operation of radio signals including said terminating call signals, wherein the improvement comprises:

means coupled to said receiving means for producing a presence signal representative of the presence of said terminating call signals by measuring an intensity of said radio signals; and means for supplying said presence signal to said battery saver circuit to make said controllable battery saver circuit release said battery saving operation.

* * * * *